United States Patent [19]

Ziemke et al.

[11] 4,152,703
[45] May 1, 1979

[54] HOMING DEVICE

[75] Inventors: Robert A. Ziemke, Sandusky; James D. Heckelman, Norwalk, both of Ohio

[73] Assignee: Dan-Mar Co., Huron, Ohio

[21] Appl. No.: 719,421

[22] Filed: Sep. 1, 1976

[51] Int. Cl.$^2$ ............................................. G01S 5/04
[52] U.S. Cl. .............................. 343/119; 343/117 R; 325/37
[58] Field of Search .................. 343/119, 120, 117 R, 343/121, 117 A, 225; 325/37

[56] References Cited

U.S. PATENT DOCUMENTS

| | | | |
|---|---|---|---|
| 2,257,203 | 9/1941 | Thacker | 343/121 |
| 2,321,478 | 6/1943 | Freeman et al. | 343/121 |
| 2,485,578 | 10/1949 | Earp et al. | 343/121 |
| 3,099,009 | 7/1963 | Stryker, Jr. | 343/119 |
| 3,795,001 | 2/1974 | Poppe et al. | 343/119 |
| 3,965,473 | 6/1976 | Isacson | 343/120 |
| 3,976,151 | 8/1976 | Farque | 343/119 X |

OTHER PUBLICATIONS

F. Terman, *Radio Engineers' Handbook*, McGraw-Hill 1943, 1st Edition, pp. 771-891.

*Primary Examiner*—Theodore M. Blum
*Attorney, Agent, or Firm*—W. Preston Hickey

[57] ABSTRACT

A homing system utilizing a loop antenna positioned at approximately 45° to the vertical to provide an electromagnetic field having both horizontal and vertical components. These signal components are picked up by a vertical loop stick antenna alternately connected to one of two bifilar wound coils of a horizontal loop stick antenna to provide alternating signals. The strength diagrams for the alternating signals are cardioid shaped and are arranged back to back with their null point passing through the intersections of the back to back signals. The null point of both antenna systems occurs when the horizontal loopstick antennas are at right angles to the electromagnetic lines of force; and any time that the horizontal loop sticks are turned at an angle relative to their null point, a difference in signal strength exists between the two antenna systems. This is picked up, and is amplified at separate time intervals by a common amplifier. The separate signals are detected, than thrown on the opposite sides of a reference voltage and filtered to give a signal, the polarity of which is indicative of the side of the null point to which the antenna is positioned and the strength of which is indicative of the amount of deviation. The signals are passed to a stepper motor which both rotates the antenna towards the sending station, and steers the driving motor for bringing the vehicle to the transmitting station. A unique automatic gain control is utilized to overcome the great difference in signal strength that exists in the 1,000 foot range adjacent to the transmitting station.

21 Claims, 6 Drawing Figures

HOMING DEVICE

BACKGROUND OF THE INVENTION

The present invention relates to a homing system for vehicles, such as amusement ride boats, to return the vehicles to a homing station on demand. Although a need for such a system has existed for decades, none has been developed heretofore to our knowledge because of the problems that are involved in operating over a considerable distance which approaches within a few feet of a sending station, and in providing an inexpensive signal system that can be used to determine on which side of the receiver the sending station lies.

A principal object of the present invention is the provision of a new and improved homing system which is relatively inexpensive to construct, rugged in its construction, and efficient and reliable in its operation, from a position within a few feet of the sending station out to the minimum signal strength which the receiver is capable to detecting.

Another object of the present invention is the provision of new and improved antenna systems for conveying directional information.

A further object of the invention is the provision of a new and improved receiver for detecting and subtracting two signals from each other and for converting the difference signal into directional and deviation information.

A further object of the present invention is the provision of a new and improved automatic gain control circuit for receivers.

A still further object of the present invention is the provision of a new and improved system for amplifying two different signals without producing an unbalance in their amplified signal.

DESCRIPTION OF THE PREFERRED EMBODIMENT

The principles of the present invention may be envisioned as embodied in a homing device for vehicles, as for example, amusement ride boats, and can be used to bring the boats back to the loading dock on a command signal. Some of the problems involved in developing such a system are explained above and succinctly stated in the objects.

According to principles of the present invention, two pieces of information are transmitted by a single loop antenna by installing the loop antenna at an angle to the vertical of approximately 45° to provide a horizontal component and a vertical component. Any suitable frequency can be utilized, as for example approximately 80,000 hertz. The electromagnetic lines of force which pass through the transmitting antenna extend outwardly and loop around both sides of the vertical plane passing through its center to the back side of the antenna. By installing the loop antenna facing the area in which the vehicles are to operate, the curved lines of force will extend out over the area and they will all converge to the area behind the antenna.

Figure 1:
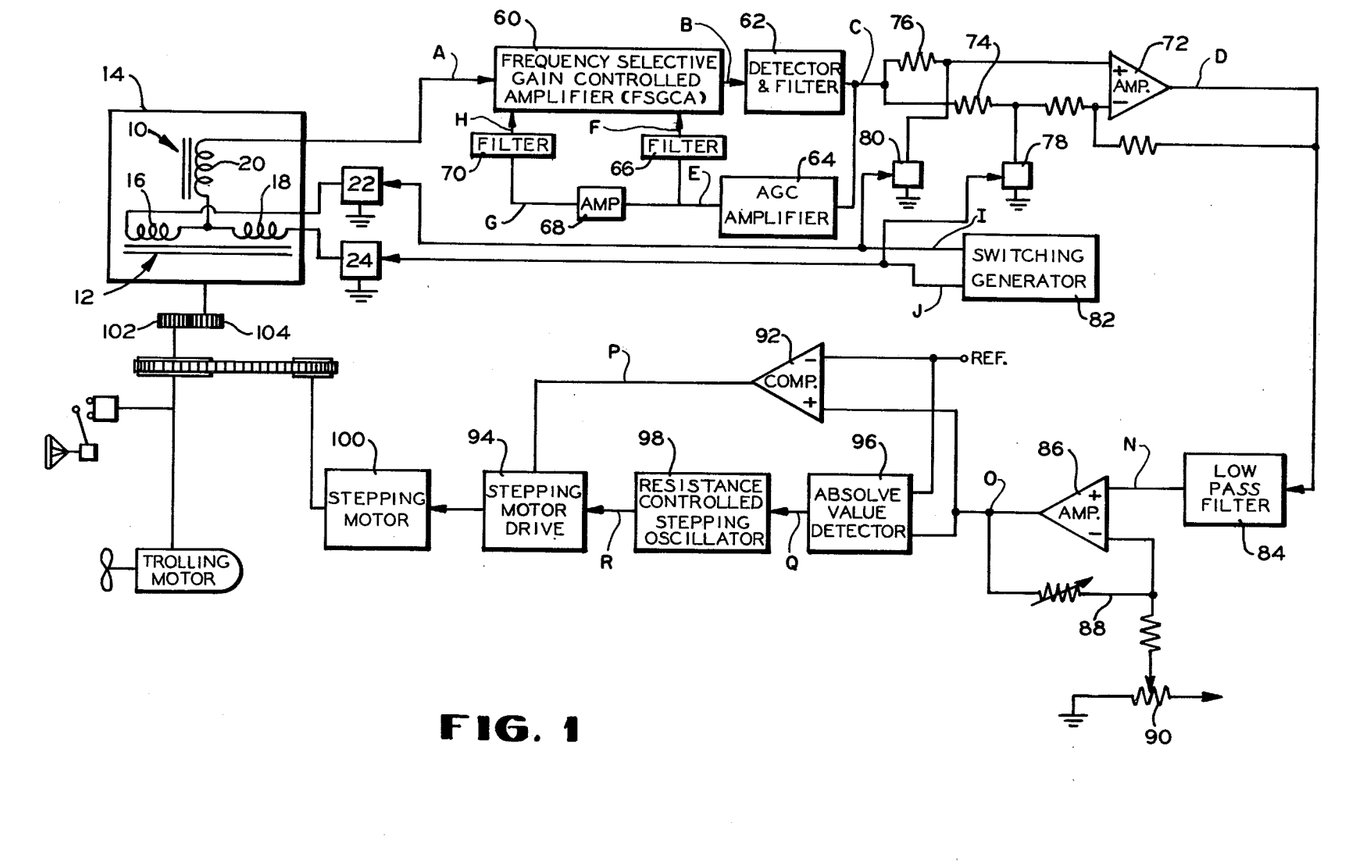
FIG. 1 is a block diagram of a preferred embodiment of the homing system of the present invention.

The receiving antennas of the present invention comprise a vertical loopstick antenna 10 and a horizontal loopstick antenna 12 which are mounted in those positions on a vertical support 14. The horizontal loopstick antenna 12 is bifilar wound with two parallel wires 16 and 18 to produce two coils which are identical. One end of the coil 16 is connected to the bottom of the vertical coil 20, and the opposite end of the coil 18 is also connected to the bottom of the vertical coil 20. The signals of the coils 16 and 18 are, therefore, of opposite polarity. The end of the coil 16 which is not connected to the coil 20 is connected to ground through a transistor switch 22, and the end of the coil 18 which is not connected to the vertical coil 20 is connected to ground through a transistor switch 24. The transistors 22 and 24, shown, are of the NPN type, and have their collectors connected to the respective coils 16, and 18, and their emitters connected to ground. In order that the transistors 22 and 24 will be positively activated, their bases are driven by transistors 26 and 28 respectively which are connected as emitter followers. Transistor 26 is an NPN transistor, the collector of which is connected to a 12 volt supply, and the emitter of which is pulled toward ground by resistor 30. The signal from the emitter of transistor 26 is connected to the base of transistor 22 through resistor 32, which has a resistance low enough to assure complete saturation of transistor 22. Unwanted switching transients are bled to ground through condenser 34. The transistor amplifier 28 is similarly biased and loaded using resistors 36, 38, and condenser 40, which are identical with resistors 30, 32 and condenser 34, respectively. By alternately activating transistor amplifiers 26 and 28 for approximately 7.5 milliseconds, two different signals are alternately produced at the output of the vertical coil 20. The output of the vertical coil 20 is connected to the primary winding 42 of an RF coupling transformer 44, which will later be described in detail.

Figure 2:
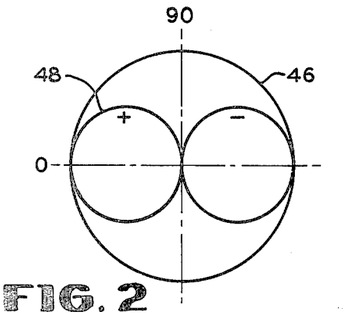
FIG. 2 is a schematic in polar coordinates depicting the signal strength of a vertical loopstick antenna, and a horizontal loop stick antenna wound in one direction.
Figure 3:
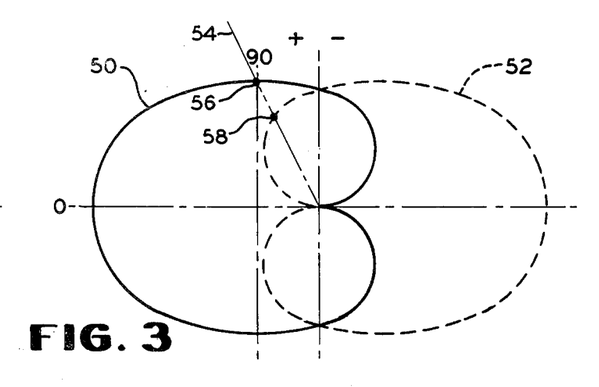
FIG. 3 is a diagramatic representation in polar coordinates in which the solid lines show the field strength on one horizontal loopstick antenna connected in series with the vertical loopstick antenna and in which the dotted lines depict the field strength of the other horizontal loopstick antenna of opposite polarity connected in series with the vertical loopstick antenna.

Referring now to FIGS. 2 and 3 of the drawings, the circle 46 represents the uniform sensitivity of the vertical coil 20 in the 360 degrees around the coil. The FIG. 8 curve 48 represents the strength of one of the horizontal coils 16 or 18 in polar coordinates. Th curve shows that its signal strength increases in one polarity when it is rotated from 0° to 90°, that it then decreases to 0 when rotated from 90° to 180°, that it then increases in opposite polarity when rotated from 180° to 270°, and then decreases to 0 when rotated from 270° to 360°.

When the signal strength 48 is added to the signal strength 46 a cardioid shaped signal strength pattern 50 is developed, as shown in FIG. 3. When the other of the bifilar wound horizontal coils 16 and 18 is added to the uniform signal 46, the cardioid shaped signal 52 represented by the dotted lines 52 in FIG. 3 is generated.

Figure 6:
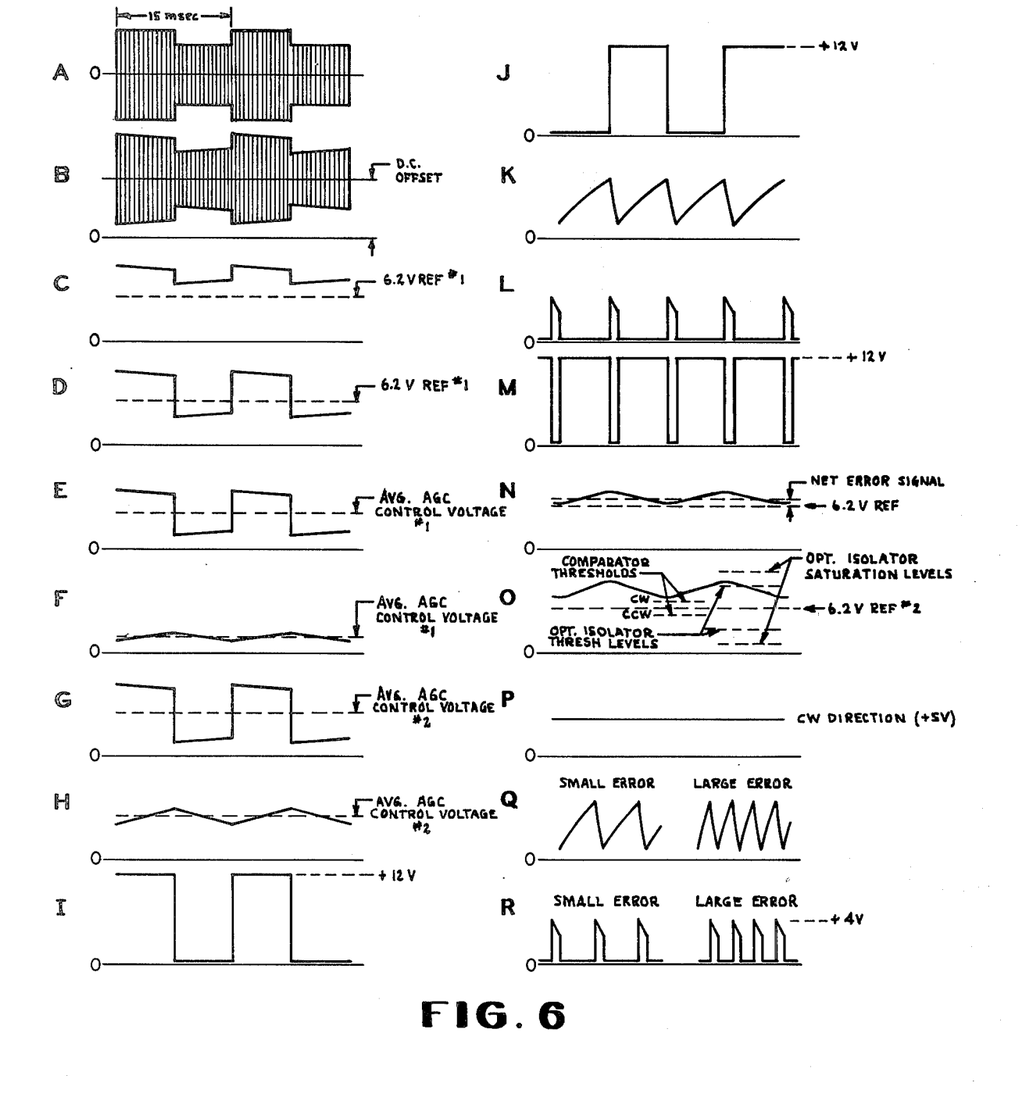
FIG. 6 shows schematic wave forms at various locations throughout the circuitry.

Assuming that the horizontal coils 16 and 18 are turned at an angle as represented by the vector line 54 in FIG. 3, it will be seen that the signal strength that is generated by one combination of one of the coils 16 and 18 with the coil 20 has a magnitude designated by the point 56, while the strength of the other one of the coils 16 and 18 with the vertical coil 20 is designated by the point 58. The signal strength on the back side of the cardioids is less than that on the front side of the cardioids. By subtracting the signal 58 from the signal 56, a net voltage is obtained which changes from positive to negative, and vice versa as the horizontal coils move from one side of the 90° position to the opposite side. Because this change in polarity occurs, it can be determined that the sending station lies to one side of the 90° position rather than on the opposite side, and the magnitude of the difference signal increases as the antenna is moved away from the 90° degree position. An overall picture of the construction and operation of the homing system can quickly be had by now referring to FIG. 1 of the drawings. In this block diagram, the circles with a letter therein indicate the wave forms at the various locations. These wave forms are given in FIG. 6 of the drawings.

As previously explained, the signal coming from the vertical coil 20, and which is fed to the primary coil 42 of the input transformer 44 will comprise an 80,000 cycle per second signal having an amplitude as determined by the vector 56 as seen in FIG. 3. This signal is communicated to the transformer 44 for 7.5 milliseconds; and immediately thereafter, for the next 7.5 milliseconds, an 80,000 cycle per second signal having an amplitude determined by the vector 58 as seen in FIG. 3, is communicated to the transformer 44. This alternating signal is then fed to a class A amplifier having a wide range of gain control, as will later be described, to provide an amplified signal having a DC offset from 0 voltage potential as shown in B in FIG. 6. The amplified signal is then detected to provide a signal which varies according to the peaks of the amplified signal. The detected signal is shown at C in FIG. 6. As previously indicated, the system is designed to operate over a great range of signal strength, and this is accomplished by feeding some of the detected signal to an automatic gain control (AGC) amplifier which provides a moderate amount of gain, the output of which is shown at E. Some of the E signal is filtered to provide a voltage which is indicative of the strength of both of the sequentially amplified signals, and this is fed back into the later stages of the gain control amplifier at a reduced voltage. The signal E from the automatic gain control amplifier 64 is further amplified at 68 to provide a voltage swing of as much as 12 volts as depicted at G. This signal is in turn filtered at 70 and fed to field effect transistors which require the full 12 volts at the gate for their operation. The field effect transistors are utilized to reduce the strength of the incoming signal. This is accomplished by shunting part of the signal to ground and simultaneously therewith, decrease the tuning of the input circuit to decrease the Q thereof and increase the transmission band width. Reducing the Q further decreases the strength of the received signal. The combined effect of varying the Q, and shunting part of the signal to ground, produces a detected signal C which is manageable over the extreme range of signal strength over which the unit must operate. Signal C is fed to an operational amplifier having both inverting and noninverting inputs, through resistors 74 and 76 respectively.

The signal at the inverting and noninverting inputs are alternately grounded out by transistor switches 78 and 80 at the same time intervals (in this case approximately 67 cycles per second) as are the electronic switches 22 and 24 which generate the alternating signal in the first instance. The transistor switches 22, 24, 78 and 80 are controlled by a switching generator "electric clock" 82 that utilizes a single "clock circuit" to provide identical time intervals for each of the two signals that are derived from the antenna system. The signals are amplified and detected by a common system to provide a signal that is devoid of any mismatch or unbalance in any way. By feeding the signal from one antenna system to the inverting input of the amplifier 72, and the signal from the other antenna system to the noninverting input of the amplifier 72, the two signals are amplified and thrown to opposite sides of a reference voltage (null point of the amplifier) to produce a signal depicted at D having square half waves on opposite sides of the reference voltage. The square half waves are of identical width, with the amplitude on one side of the reference voltage being indicative of the vector 56 and the amplitude on the opposite side of the reference voltage being indicative of the vector 58. This signal is then passed through a low pass filter 84 having a decay time greater than 1/67th of a second to filter the pulsating signal to a degree where it has but mild ripples. The average value of this signal falls above or below the reference voltage depending on which side of the 90° mark the vectors 56 and 58 fall. This wave form is then amplified by an operational amplifier 86 having an adjustable feedback circuit 88, and a reference potential adjustment 90 to trim out any error in the system.

The output of the operational amplifier 86 is shown at 0 and this signal is split two ways to provide a direction signal and a deviation signal with respect to the 90° or null position of the antenna system. The direction signal is a function of whether or not the signal is positive or negative with respect to the reference voltage; and this is determined by the comparator 92 which, in the present instance, is a low gain operational amplifier having inverting and noninverting inputs. A reference voltage is applied to the inverting input at all times and the signal 0 is fed to the noninverting input of the comparator to provide an output signal of 5 volts when the signal 0 is above the reference voltage, and no output when the signal 0 is at or below the reference voltage. A 5 volt directional signal is indicated at P, and when this voltage is delivered to a stepping motor logic circuitry 94, an output directional signal in one direction is generated; and when 0 voltage is applied to the stepping motor logic circuitry 94, the opposite directional signal is provided.

As previously indicated, the signal 0 is split to also provide a deviation signal which, in the present instance, is generated by an absolute value detector 96. In the present instance, the absolute value detector 96 is an optic isolator, the output signal of which is a function of the deviation from the reference voltage regardless of which side of the reference voltage the input signal may be. This output signal appears as a varying resistance which is used to control the frequency of an RC relaxation oscillator utilizing, as for example a unijunction transistor, to produce a series of short pulses the frequency of which are a function of the deviation in signal 0 from the reference voltage. This is done in what is called a resistance controlled stepping oscillator 98, the output signal of which is indicated at R. The wave form R is also supplied to the stepping motor logic circuitry 94 which in turn translates and sends signals to a stepping motor 100 which simultaneously steers the vehicle nd rotates the antenna system 14 to the null position. The steering system and the antenna system 14 are moved whenever a change in the vehicle's alignment occurs relative to the lines of force from the transmitting antenna. By holding the antenna system 14 at right angles to the lines of force from the transmitting antenna, the vehicle can be homed to a position adjacent the transmitting antenna. In the present instance, the vehicles are propelled by a trolling motor that is positioned at the rear of the vehicle to push the boat. Therefore, the antenna system is rotated in the opposite direction to the steering motor by meshing gears 102 and 104 having a one to one ratio.

Frequency Selective Gain Controlled Amplifier

Figure 4:
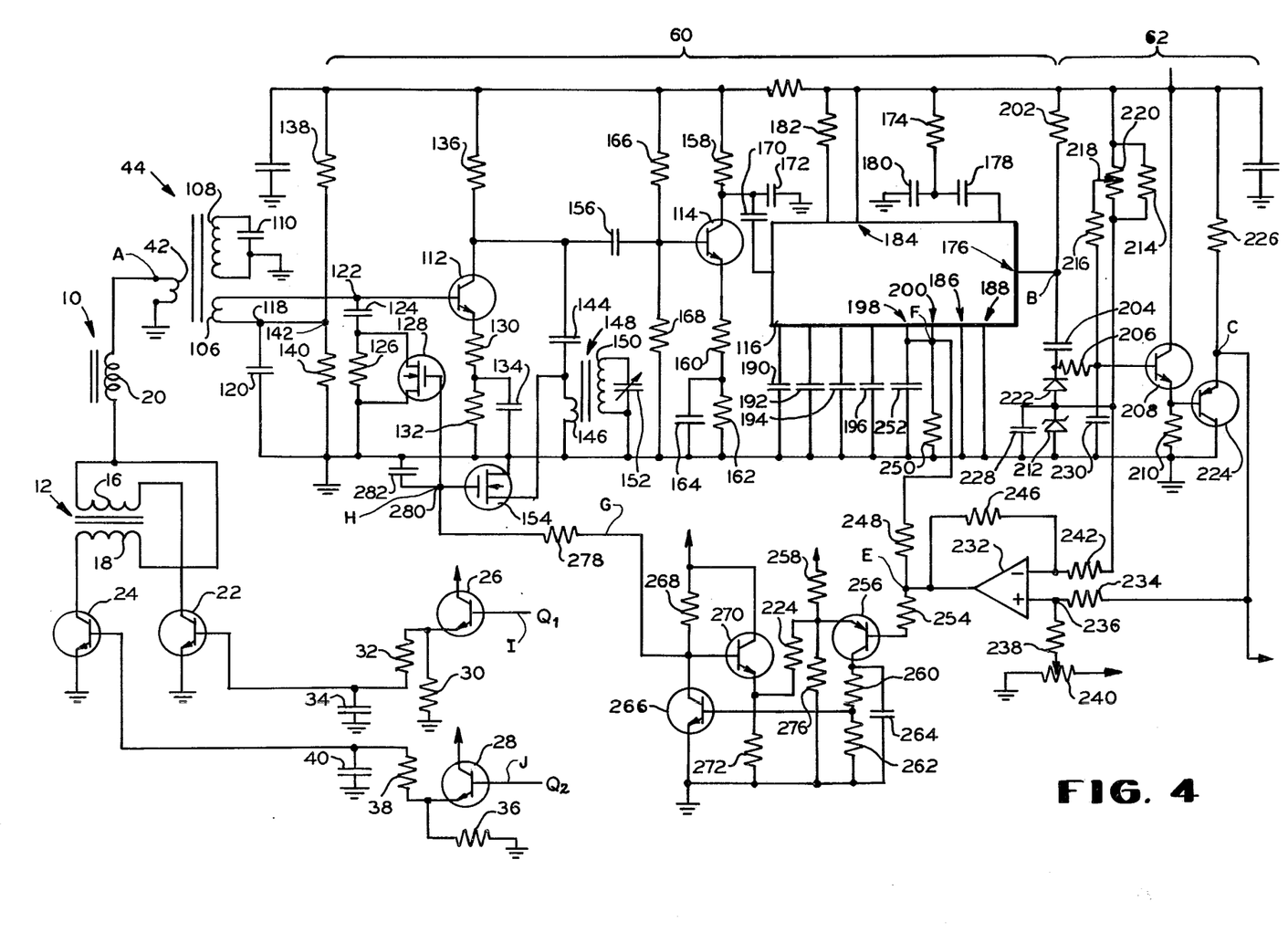
FIG. 4 is a schematic wiring diagram for one half of a receiver embodying principles of the present invention.

Referring to the wiring diagram shown in FIG. 4, the alternating signals from the antenna system is communicated to the primary coil 42 of the input transformer 44. The input transformer 44 includes an output or secondary coil 106, and a tuning coil 108, one end of which is communicated directly to ground, and the other end of which is communicated to ground through a variable condenser 110. The coils 42, 106 and 108 are inductance coupled, and in this instance, the variable condenser 110 is adjusted to tune this input coil to a frequency of 80,000 Hertz. The 80K signal from the output coil 106 is then amplified by the class A amplifier 60 which comprises the transistors 112, 114 and the two stage chip amplifier 116.

One end of the output coil 106 is connected to ground through terminal 118 and condenser 120 which is designed to pass the RF frequency. The other end of the coil 106 is connected to ground through terminal 122, condenser 124, and load resistor 126. The RF signal appears at terminal 122.

A Metal Oxide Silicon Field Effect Transistor 128 is connected in parallel with the load resistor 126 to provide a modulating bypass around the load transistor 126 to decrease the voltage generated at the condenser for purposes of controlling gain, as will later be described.

The signal from the terminal 122 is connected to the base of input transistor 112, which in the present instance is an NPN transistor, whose emitter is connected to ground through an unbypassed emitter resistor 130 and a biasing resistor 132 which are connected in series. A condenser 134 parallels the biasing resistor to conduct the RF frequency to ground. The collector of the transistor 112 is connected to a 12 volt power supply through a load resistor 136. The base of the transistor is biased into continuous operation, to form a class A amplifier, by a voltage divider circuit comprising resistors 138 and 140 that are connected in series between the 12 volt power supply and ground, and the connecting terminal 142 of which is connected to the terminal 118. Resistor 140 is of the same value as resistor 132, thus permitting a high degree of DC stability of the first amplifier stage.

A fluctuating RF voltage appears at the collector of the transistor 112. This fluctuating RF voltage is transmitted to ground through a condenser 144 and primary coil 146 of a tuneable transformer 148. The secondary coil 150 of the transformer is connected in parallel with a tuneable condenser 152, the both of which are connected to ground. Coils 146 and 150 are inductively coupled, and the condenser 152 is adjusted so that resonance occurs at 80K Hertz. Another MOSFET transistor 154 is connected to ground paralleling the input coil 146 for the purpose of controlling gain. This will later be explained in more detail in the discussion of the automatic gain control circuit.

The tuned output signal from the collector of the transistor 112 is coupled to the base of transistor 114 by an RF passing condenser 156. In the present instance, transistor 114 is an NPN transistor, the collector of which is connected to the 12 volt power supply by resistor 158. The emitter of transistor 114 is connected to ground through an unbypassed emitter resistor 160 and DC biasing resistor 162. The biasing resistor 162 is bypassed by an RF passing condenser 164. The transistor 114 is continuously biased on, by the voltage divider circuit formed by resistors 166 and 168 which are connected in series between the 12 volt power supply and ground, and the junction of which is connected to the base of the transistor 114. The resistors 168 and 162 have the same values as do the resistors 140 and 132 respectively.

The bulk of the amplification of the incoming signal is produced by the two stage chip amplifier 116, the input of which is coupled to the collector of transistor 114 through an RF passing condenser 170. A condenser of much smaller capacitance is connected between the collector of the transistor and the ground to remove unwanted high frequency noise.

As previously indicated, the chip amplifier 116 has two stages with the resister 174 that is connected to the 12 volt power supply being the load resistor for the first stage, and the terminal 176 being the output of the second stage. The output from the first stage is coupled back into the second stage by an RF passing condenser 178. A noise eliminating condenser 180 of much smaller value is connected between the first stage output and ground, as is customary. Resistor 182 supplies a de-coupled positive voltage, while connection 184 supplies a full 12 volt positive voltage to the amplifier. Connections 186 and 188 complete the power circuits to ground. Bypass condensers 190, 192, 194, 196 bypass various parts of the amplifying circuitry within the chip to ground. The terminals 198 and 200 are gain control terminals for the first and second stages respectively. The signal from the output terminal 176 is passed to the detector circuit 62.

Detector Circuit 62

The output terminal 176 of the chip amplifier 116 is connected to the 12 volt power supply through a load resistor 202. A reference voltage of 6.2 volts is developed by a Zener diode 212, the cathode of which is connected to the 12 volt power supply through a resistor 214. The RF signal from the output terminal 176 is connected through RF passing condenser 204 to the cathode of diode 222, the anode of which is connected to the 6.2 volt reference. Detector diode 222 conducts on negative peaks of the RF signal thus causing the average charge of condenser 204 to decrease. A rectified AC voltage which is positive with respect to the 6.2 volt reference is developed at the cathode of detector diode 222. This rectified voltage is filtered by resistor 206 and condenser 230 thus producing a voltage at the base of transistor 208 which varies in accordance with the amplitude peaks of the RF signal at 176. Resistor 206 is sufficiently large to prevent loading of the AC component of the signal at the cathode of detector diode 222. The base of transistor 208 is connected through a resistor 216 to the wiper 218 of a variable resistor 220, the end terminals of which are connected in parallel with the resistor 214. The positioning of the wiper 218 can effect a small amount of adjustment to the quiescent voltage at the base of transistor 208. Transistor 208 is connected in the emitter follower configuration, and its emitter is connected to the base of a transistor 224 which is connected in a complimentary configuration relative to the transistor 208, so that its output signal is at the same quiescent voltage, or null, or reference voltage as is the base of the input transistor 208. It will be seen that the negative voltage drop between the base and emitter of 208 is just offset by the positive voltage differential of the base-emitter junction of the transistor 224. Resistor 226 is a load resistor connected between the emitter and the 12 volt power supply. The collector, of course, is connected directly to ground, with the resistor 210 providing a pull down for the emitter of transistor 208. The output signal from the transistor 224 is as depicted by wave form C and will at all times be greater than the reference voltage of 6.2 Volts. Condenser 228 is connected in parallel with Zener diode 212 to remove any noise, ripple, or transients which might otherwise appear on the 6.2 volt reference bus.

Automatic Gain Control

Part of the detected signal C is communicated to the noninverting input of amplifier 232 through a voltage divider circuit which comprises a fixed resistor 234 that is connected between the output of transistor 224 and junction 236, and a resistor 238 that is connected between the junction 236 and the wiper 240 of a potentiometer. The resistance element of the potentiometer is connected between gound and a 12 volt power supply. The junction 236 is connected to the noninverting input of the amplifier 232. The potentiometer permits the adjustment of the average offset from 6.2 volts of wave form C by establishing a set point which, in conjunction with resistors 234 and 238, produces a null at point 236. The 6.2 reference voltage that is supplied by the Zener diode is connected to one end of a fixed resistor 244, the other end of which is connected to the inverting input of the amplifier 232. Negative feedback for the amplifier 232 is provided by a resistor 246 that is connected between the output and the inverting input of the amplifier. The wave form at this point is given at E in FIG. 6. Part of this output signal is reduced in voltage through a voltage divider circuit comprising a resistor 248 and a resistor 250 with the junction between these resistors being connected to the gain control terminals 198 and 200 of the first and second stages of the amplifier chip 116. This signal is simultaneous filtered by a condenser 252 that is connected between ground and the terminal between the resistors to give the wave form shown at F. The output signal from the amplifier 232 passes through a load stabilizing resistor 254 of relatively small value to a two stage transistor amplifier designed to increase the output voltage for a signal swing between 0 and 12 volts.

The two stage amplifier functions as an operational amplifier. The transistor 256 is a PNP transistor, the emitter of which is connected to a 6.2 volt power supply through a small resistor 258. The collector of the transistor 256 is connected to ground through voltage dividing load resistors 260 and 262. A condenser 264 provides the frequency compensation necessary to stabilize the two stage amplifier. The terminal between the two load resistors 260 and 262 is connected to the base of the second transistor amplifier 266 whose emitter is connected directly to ground, and whose collector is connected to a 12 volt power supply through a load resistor 268. The collector of transistor 266, therefore, can swing almost between ground and the 12 volt power supply. Negative feedback is supplied to the transistor 256. This is accomplished by connecting the collector of transistor 266 to the base of a similar transistor 270 whose collctor is connected directly to the 12 volt power supply and whose emitter is connected to ground through a load resistor 272. The feedback transistor 270 is operated in the emitter follower mode to reduce loading of the collector of transistor 266. The signal passes from the emitter through a feedback resistor 224 to the emitter of transistor 256. The normal voltage for the emitter of the transistor 256 is established by the voltage divider circuit comprising resistors 258 and 276, with the terminal between being connected to the emitter of transistor 256. The output of the two stage automatic gain control amplifying circuit has the wave form G which is then passed on to a filtering circuit 70 before it reaches the input stages of the gain controlled amplifier 60.

Filtering Circuit 70

Filtring circuit 70 comprises a resistor 278 of large resistance that is connectd between the collector of the transistor 266 and a terminal 280. Terminal 280 is connected to ground through the filtering condenser 282 which is of a large enough value that it smooths out the signal to an essentially smooth DC voltage as shown at H. This DC voltage may vary from almost 0 volts to almost 12 volts. The junction 280 is connected to the gate of the Metal Oxide Silicon Field Effect Transistor 128, and to the gate of the Metal Oxide Silicon Field Effect Transistor 154, both of which require from 0 to approximately 12 volts for their full modulation. As previously explained, the Field Effect Transistors are used as voltage controlled attenuators to assist in achieving the extremely wide range automatic gain control feature required of this receiver. When Field Effect Transistor 128 is biased off, the Q of the resonant winding 108 of transformer 44 is maximum and the signal transmission is maximum at 80 KC. When Field Effect Transistor 128 is biased on by the AGC amplifier, its lowered channel resistance shunts part of the signal at point 122 to ground. At the same time, its lowered channel resistance, as transformed to the resonant winding 108 of transformer 44, lowers the Q of the resonant winding, increases the band width, and as a consequence, causes an additional amount of attenuation. The gain control range thus obtained is, therefore, much greater than which normally can be obtained in a conventional voltage controlled attenuator not utilizing a resonant circuit. Field Effect Transistor 154 functions in a similar manner in conjunction with the resonant winding 150 of transformer 148. The output wave form of the gain controlled circuit 60, therefore, is fairly constant from a location that is within a few yards of the transmitter to a location 200 yards or more away from the transmitter's location.

Converter Amplifier 72

Figure 5:
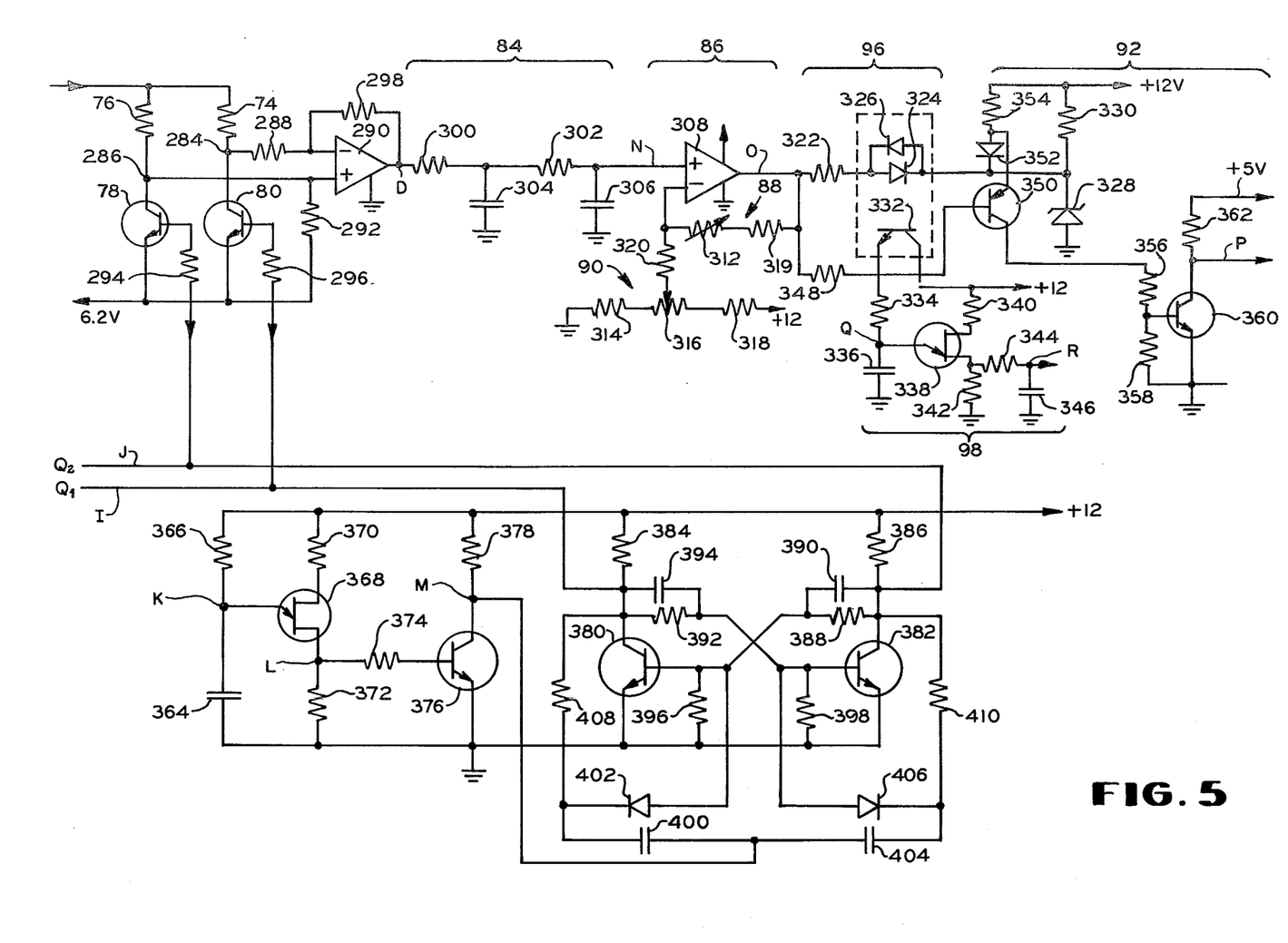
FIG. 5 is a schematic wiring diagram of the other half of the receiver.

The signal from the detector circuit 62 has the wave form C and is also passed to the converter amplifier 72 to produce a signal which swings on both sides of the reference voltage. The signal from the transistor 224 splits to pass through two parallel load resistors 74 and 76 to terminals 284 and 286 respectively. The signal at terminal 284 is fed through a second resistor 288 to the inverting input of an operational amplifier 290. The other terminal 286 is connected directly to the noninverting input of the operational amplifier 290. A reference voltage of 6.2 volts is passed through the resistor 292 to provide a constant positive biasing voltage for the amplifier 290. The transistor switch 78 is connected in series between the terminal 286 and the 6.2 reference voltage, while the terminal 284 is connected to the same reference voltage by a similar transistor switch 80. The base of the transistor switch 78 is connected through a current limiting resistor 294 to the same signal producing means that is utilized to actuate the base of antenna switch 26; and the base of the transistor switch 80 is connected through current limiting resistor 296 to the same signal means as actuates the antenna signal switch 28. When transistor switch 80 is turned on, no signal reaches the inverting input to the amplifier 290, so that the signal produced by the transistor switch 22 goes to the noninverting input of the amplifier. When transistor switch 78 is operated, the signal produced by the antenna switch 24 reaches the inerting input of the amplifier 290 to throw the output to the opposite side of the reference voltage. The square half waves produced by each of the antenna switches 22 and 24 are thereby caused to be on opposite sides of the reference voltage. The amplitude of the square half waves on one side of the reference voltage corresponds to the vector 56, while the amplitude of the square half wave on the opposite side corresponds to the vector 58. The values of resistors 74, 76, 288, 292, and 298 are chosen to insure that the closed loop gain of amplifier 290 is constant regardless of which transistor switch is activated. The wave form at the output of the amplifier 290 is shown in wave form D of FIG. 6.

Low Pass Filter Circuit 84

Wave form D from the amplifier 290 then passes to the low pass filter network 84 which comprises resistors 300 and 302, that are connected in series, and filtering capacitors 304 and 306 which connect the output of the resistors 300 and 302, respectively, to ground. These capacitors are sized to smooth out the oscillating signal to a generally constant voltage having but a slight ripple as shown by wave form N. This voltage will deviate from the reference voltage in an amount depending upon the deviation of the antenna from the 90° position, and will be above or below the reference voltage depending upon which side of the 90° position the antenna is positioned. The filtered signal is then passed to the amplifying circuit 86. The output of the filter is connected to the noninverting input of an operational amplifier 308.

Amplifier Circuitry 86

As previously indicated, the amplifier circuitry 86 is provided with a gain control which adjusts the amount of negative feedback around operational amplifier 308. The output of the operational amplifier is connected to its inverting input through the series combination of fixed resistor 319 and variable resistor 312. The amplification or voltage deviation from the reference voltage can thereby be adjusted by adjusting the variable resistor 312 to regulate the amount of negative feedback. The reference voltage about which the amplifier 308 swings is determined by the circuitry 90 previously mentioned.

The circuitry 90 comprises a resistor 314, a variable resistance 316 and another fixed resistor 318 connected in series between the 12 volt power supply and ground. The wiper of the variable resistor 316 is connected to a resistor 320 which in turn is connected to the inverting input of the amplifier 308 to adjust the reference voltage that is applied thereto. The wave form of the output signal for the amplifier circuitry 86 is shown at 0 in FIG. 6.

Absolute Value Detector Circuit 96

The output of the amplifier circuit 86 is passed through a current limiting resistor 322 to a pair of light emitting diodes 324 and 326 which are connected in parallel but arranged to pass current in opposite directions, and the other end of which are connected to a 6.2 voltage source obtained by a voltage divider network comprising a Zener diode 328, and a resistor 330, which connects the Zener diode to the 12 volt power supply. The light emitted by both light emitting diodes 324 and 326 is seen by a light sensitive transistor 332. The collector of the light sensitive transistor 332 is connected to the 12 volt power supply and its emitter is connected to the stepping oscillator circuitry 98 later to be described. The LED 324 gives off an amount of light depending upon the positive deviation of the signal and the light emitting diode 326 gives off an amount of light depending upon the negative deviation of the signal. The output of the light sensitive transistor 332 will be a function of the positive and/or negative deviation from the reference voltage.

Stepping Oscillator Circuitry 98

The output signal from the emitter of the light sensitive transistor 332 appears as a varying resistance which decreases as the deviation of the error signal from the reference voltage increases. The emitter of the light sensitive transistor is connected to condenser 336 and the emitter of unijunction transistor 338 through resistor 334. The other side of the condenser is grounded. The collector of the light sensitive transistor is connected to the 12 volt power supply. Resistor 334 and condenser 336 are sized to limit the minimum length of time for the charging of the condenser 336. One base of the unijunction transistor 338 is connected to the 12 volt power supply through a resistor 340 and its other base is connected to ground through a resistor 342 having a much lower resistance. The charge on the condenser 336 builds up over a short period of time to the firing voltage of the unijunction transistor 338, whereupon the emitter voltage is quickly drained. The transistor resets itself to a nonconducting condition while the condenser 336 slowly charges. The voltage at the emitter of unijunction transistor 338 has a wave form shown by Q in FIG. 6. The signal from the lower base of the unijunction transistor 338 passes through an RC filter consisting of the resistor 344 and the condenser 346 to remove stepping signal transients. The signal at the output of the filter is a series of pulses which are spaced apart at various time intervals. The pulses are all of the same height, but are spaced apart at time intervals that are inversely proportional to the deviation of the signal from the reference voltage. Wave form R shows the shape of the pulses as they appear at the output of the RC filter. As previously indicated, the signal from the oscillator 98 is connected to the stepping motor logic circuitry 94 to provide a stepping signal for the stepping motor 100.

Comparator Circuit 92

Also as previously indicated, the direction signal for the stepping motor 100 is provided by the comparator circuitry 92, which derives its signal from the amplifier circuitry 96 through a current limiting resistor 348 that is connected to the base of an on-off transistor 350. The emitter of the transistor 350 is supplied with slightly more than 6.2 volts. By reason of the voltage rise across a diode 352 that is connected to the 12 volt power supply through a drain resistor 354, the voltage drop across the junction of the diode 352 is equal and opposite to the drop in voltage from the emitter to the base of the transistor 350, so that the null point of the transistor 350 is at 6.2 volts. The collector of transistor 350 is connected to ground through load resistors 356 and 358 that are connected in series and the terminal between which is connected to the base of amplifying transistor 360. The emitter of the transistor 360 is connected directly to ground, and since the transistor is an NPN transistor, resistor 358 causes the transistor to turn on whenever a signal is received from the transistor 350. The collector of the transistor 360 is connected to a load resistor 362 which in turn is connected to a 5 volt power supply, so that the signal at the collector of transistor 360 is 5 volts when the transistor is off or near zero volts when the transistor is on. This signal is a constant voltage, as incidated by wave form E, and occurs during deviation of the antenna system in one direction from its 90° position. A zero voltage occurs during deviation of the antenna system in the opposite direction from its 90° antenna position. These signals are delivered to a stepping motor logic circuitry 94 of commercial design which in turn controls the direction of rotation of a stepping motor 100, also of commercial design.

Switching Generator Circuitry 82

As previously indicated, the switching generator circuitry 82 provides alternate signals each of which are of a precise time interval, that in the present instance is approximately 7.5 milliseconds. The time interval is determined by the charging of a condenser 364 through a resistor 366 that is connected to the 12 volt power supply. The opposite side of the condenser 364 is, of course, connected to ground. The terminal between the condenser 364 and resistor 366 is connected to the emitter of a unijunction transistor 368 which fires when the voltage on the condenser builds up to a predetermined voltage. One base terminal of the unijunction transistor 368 is connected to the 12 volt power supply through resistor 370 and the other base is connected to ground through the resistor 372. The wave form at the emitter of the unijunction transistor 368 is shown at K in FIG. 6. The shape of the signal at the output of the unijunction transistor is shown at L. The output signal L is connected through a current limiting resistor 374 to the base of a transistor switch 376, the emitter of which is connected to ground, and the collector of which is connected to the 12 volt power supply. The signal at the output of the switch 376 is indicated by the wave form M and comprises a series of square voltage signals that are spaced apart by 7.5 milliseconds. This series of pulses are utilized as triggering impulses for a pair of transistors 380 and 382 that are connected inbstable circuitry so that each is alternately turned on and off by succeeding pulses. This is accomplished by having the emitters of both transistors 380 and 382 connected to ground and the collectors of both transistors are connected to the 12 volt power supply through identical resistors 384 and 386, respectively. The base of transistor 380 is connected to the collector of transistor 382 through resistor 388 and paralleling condenser 390. The base of transistor 382 is connected to the collector of the transistor 380 through resistor 392 and paralleling condenser 394. The resistances of the resistors 388 and 392 are identical and the capacitance of the capacitors 390 and 394 are identical. Resistors 396 and 398 pull the bases of transistors 380 and 382, respectively, toward ground to ensure that the transistors can be turned completely off. The pulse signals from the transistor 376 are connected to the bases of both transistors 380 and 382 through parallel circuits which comprise condenser 400 and diode 402, and condenser 404 and diode 406, respectively. The diodes, of course, are arranged to pass a negative pulse. The terminal between the condenser 400 and diode 402 is connected to the collector of transistor 380 through resistor 408. The junction between the condenser 404 and diode 406 is connected to the collector of transistor 382 through resistor 410.

Assuming that the transistor 382 is on, the initial drop in voltage at the start of a pulse passes through the condenser 404 and the diode 406 to the base of the transistor 382 to turn transistor 382 off. With transistor 382 now off, the voltage at its collector immediately raises to pass a signal through the resistor 388 to the base of transistor 380. This turns transistor 380 on. With transistor 380 now turned on, a drop in voltage occurs at its collector and this drop is transmitted through the resistor 392 to the base of the transistor 382 to now hold the transistor 382 off. During the transition time, condensers 390 and 394 make the action upon the base of the opposite transistor even faster by transmitting an immediate voltage change which is sustained by the cooperating resistor 388 or 392 as the case may be. The next pulse, of course, turns the transistor 380 off and the transistor 382 on to repeat the cycle and produce the timing pulses I and J which actuate the antenna switches 22 and 24 and signal commutating switches 78 and 80.

While the invention has been described in considerable detail, we do not wish to be limited to the particular embodiments shown and described; and it is our intention to cover hereby all novel adaptations, modifications, and arrangements thereof which come within the practice of those skilled in the art, and which fall within the purview of the following claims.

We claim:

1. A radio control system comprising: a transmitting antenna producing a high frequency alternating field having both horizontal and vertical components, a first receiving antenna producing an output that is primarily a function of said vertical component, a second receiving antenna producing an output that is primarily a function of its angular position to said horizontal component a third receiving antenna that is angularly positioned along with said second antenna and producing an output that is a function of its angular position to said horizontal component but which is of opposite electrical polarity with respect to the output of said second receiving antenna, first switch means actuated at an audio frequency and which when actuated adds the output of said first and second receiving antennas, second switch means actuated at an audio frequency and which when actuated adds the output of said first and third receiving antennas, conductor means receiving the alternate signals of said first and second switch means to provide an amplitude modulated signal the peaks and valleys of which correspond to the strength of said signals from said first and second switch means, means for detecting the amplitude modulated signal and providing a signal having peaks and valleys both of which are on one side of a reference voltage different from ground, signal adjusting means causing the voltage differential obtained by subtracting the valleys from a reference voltage which differential is in turn subtracted from the reference voltage while leaving the peaks substantially unchanged to provide a synthetic signal, filter means filtering the synthetic signal to provide a D.C. voltage, and means using the filtered synthetic signal for control.

2. The control system of claim 1 wherein said signal adjusting means comprises: an operational amplifier having inverting and noninverting inputs, and third switch means operated in unison with said first and second switch means for causing the signal produced by said first switch means to be applied to said operational amplifier through said inverting input and causing the signal produced by said second switch means to be applied to said operational amplifier through said noninverting input.

3. The control system of claim 1 wherein said last mentioned means compares said D.C. voltage to a predetermined reference voltage to provide one directional signal when above said predetermined voltage and an opposite directional signal when below said predetermined reference voltage.

4. The control system of claim 3 including means providing pulses the speed of which is a function of the degree to which said D.C. voltage differs from said predetermined reference voltage.

5. The control system of claim 3 including drive means utilizing said directional signal to rotate the second and third receiving loop antennas to the null position.

6. The control system of claim 1 wherein said signal adjusting means comprises: an operational amplifier having an inverting and a noninverting input, third switch means operated in unison with said first switch means and operatively delivering said peaks of said detected signal to said noninverting input, fourth switch means operated in unison with said second switch means and operatively delivering said valleys of said detected signal to said inverting input, and said filter means filters the output of said operational amplifier.

7. The control system of claim 6 including: means deriving an AGC (automatic gain control) signal from said pulsating D.C. voltage and delivering said AGC signal to said amplifier in a manner decreasing the strength of said signal from said first and second switch means.

8. The control system of claim 6 including a high Q tuned circuit for transmitting said signal from said first and second switch means to said first amplifier, means deriving an AGC (automatic gain control) signal from said pulsating D.C. voltage and delivering said AGC signal to said high Q tuned circuit to decrease the signal strength by increasing the damping applied to the said tuned circuit.

9. The control system of claim 8 where said high Q tuned circuit tunes each of the two antenna systems to resonance when their respective switch means (first or second) is actuated.

10. The radio control system of claim 1 wherein said second and third receiving antennas are bifilar wound coils of a horizontal loopstick antenna.

11. The control system of claim 1 where the transmitting antenna is positioned at an angle to the vertical to produce the said horizontal and vertical components.

12. The control system of claim 1 where separate horizontally and vertically positioned receiving antennas are used to produce outputs that are a function of said horizontal and vertical field components.

13. The control system of claim 1 where said second receiving antenna is effectively connected in series with said first receiving antenna when said first switch means is actuated, and said third receiving antenna is effectively connected in series with said first receiving antenna when said second switch means is actuated.

14. A direction sensing device comprising: a first antenna system the output signal of which differs in amplitude on opposite sides of its null point and the change in strength of which per degree of rotation differs on opposite sides of the null point, a second antenna system providing an output signal corresponding to said first antenna system but the corresponding points of which are on opposite sides of said null, said antenna systems being fixed relative to each other with their null points coinciding, means amplifying the output of both antenna systems separately, means detecting both amplified signals separately, means combining said detected signals by causing peaks of the detected signals to alternate with each other and with the alternating peak to be on opposite sides of a reference voltage different from ground, and means filtering the combined signal to produce a signal that is a function of the deviation of said antenna systems from said null.

15. A direction sensing device comprising: a first antenna system the output signal of which differs in amplitude on opposite sides of its null point, a second antenna system the output signal of which differs in amplitude on opposite sides of its null point, said first and second antenna systems being rotatable in fixed phase relationship with each other, a first amplifier, a high Q circuit feeding said amplifier, a first switch means which when actuated communicates said first antenna system to said high Q circuit, second switch means which when actuated communicates said second antenna system to said high Q circuit, electronic clock means alternately actuating said first and second switch means, detection means detecting the output of said amplifier, an operational amplifier having inverting and noninverting inputs, third switch means operated by said electronic clock means and communicating the output of said detection means to said inverting input in unison with the actuation of first switch means, fourth switch means operated by said electronic clock means and communicating the output of said detection means to said noninverting input in unison with the actuation of said second switch means, and filter means filtering the output of said operational amplifier to provide a composite D.C. signal.

16. The device of claim 15 including a stepper motor for rotating said antenna systems in unison, a comparator for comparing the polarity of said composite D.C. signal to a reference voltage to provide a first output direction signal to said stepping motor when said composite D.C. signal is positioned with respect to the reference voltage, and a second output direction signal to said stepping motor where said composite D.C. signal is negative with respect to the reference voltage, an optical isolator for providing a signal that is a function of the divergence of said composite D.C. signal from said reference voltage, and a stepping oscillator delivering a stepping signal to said stepping motor the frequency of steps of which is a function of the output of said optical isolator.

17. The control system of claim 16 including means deriving an AGC signal from said detection means and delivering said AGC signal to said high Q circuit to decrease the signal strength by increasing the damping applied to the said high Q circuit.

18. A homing device comprising: first and second antenna systems providing signals from a sending station which signals have similar strength patterns that project on opposite sides of the null position for both systems, means for amplifying and detecting both signals relative to a reference voltage above ground and feeding respective detected signals to respective noninverting and inverting inputs of an operational amplifier having a constant biasing voltage corresponding to the null position of said first and second antenna systems, and filtering means to provide a composite signal the strength of which relative to the reference voltage indicates from which side of the null position the signal was received.

19. A radio control system comprising: first and second antenna systems which provide different signals in response to direction from a transmitted source; first means alternately communicating signals from said first and second antenna systems to amplifier means to produce a synthetic wave form; second means detecting said synthetic wave form to give a pulsating D.C. voltage having crests and valleys; third means producing a second synthetic wave form in which a first voltage differential between the crests and a reference voltage different from ground, and a second voltage differential between the valleys and said reference voltage, are caused to be on opposite sides of a reference voltage; fourth means averaging peaks and valleys of said second synthetic wave form; and means utilizing the average voltage so produced as a control function.

20. The system of claim 19 wherein said last mentioned means comprises: an optical isolator, means feeding the output signal of said optical insulator to the base of a unijunction transistor and to a condensor through a bleed resistor, to produce a series of pulses the frequency of which is a function of said output signal of said fourth means.

21. The system of claim 20 wherein: said third means comprises an operational amplifier having inverting and noninverting inputs to one input of which the crests of said pulsating D.C. voltage is communicated, and to the other input of which the valleys of said pulsating D.C. voltage is communicated.

* * * * *